United States Patent [19]

Ittemann et al.

[11] Patent Number: 4,751,274

[45] Date of Patent: Jun. 14, 1988

[54] PREPARATION OF AROMATIC BLOCK COPOLYETHERS

[75] Inventors: Peter Ittemann, Ludwigshafen; Gerhard Heinz, Weisenheim, both of Fed. Rep. of Germany

[73] Assignee: BASF Aktiengesellschaft, Rheinland-Pfalz, Fed. Rep. of Germany

[21] Appl. No.: 2,236

[22] Filed: Jan. 12, 1987

[30] Foreign Application Priority Data

Jan. 24, 1986 [DE] Fed. Rep. of Germany ....... 3602090

[51] Int. Cl.[4] .............................................. C08L 77/00
[52] U.S. Cl. ..................................... 525/534; 525/471
[58] Field of Search ................................ 525/534, 471

[56] References Cited

U.S. PATENT DOCUMENTS 4,176,222 11/1979 Cinderey et al. ................... 528/126
4,446,294 5/1984 Rose et al. .......................... 528/128

Primary Examiner—Melvyn I. Marquis
Attorney, Agent, or Firm—Oblon, Fisher, Spivak, McClelland & Maier

[57] ABSTRACT

In the preparation of block copolyethers which contain sulfonyl and keto groups by polycondensation of aromatic dihalogen compounds and bisphenols in the presence of an alkali metal carbonate in N-methylpyrrolidin-2-one as a solvent, an amorphous polyether sulfone block having a molecular weight Mn of from 1,500 to 30,000 is prepared in a first stage, and, in a second stage, a polyetherketone block is polymerized onto the living chain ends, the molar ratio of sulfonyl to keto groups being from 90:10 to 40:60.

2 Claims, No Drawings

PREPARATION OF AROMATIC BLOCK COPOLYETHERS

The present invention relates to a process for the preparation of block copolyethers, in particular keto-containing polyethersulfones. Because of their good stability at high temperatures, polymers containing sulfonyl and ether groups are becoming increasingly important for the production of industrial articles. They are preferably prepared by polycondensation of bisphenols with sulfonyl-containing dichloroaromatics in the presence of polar solvents and anhydrous potassium carbonate. The use of N-methylpyrrolidone as a solvent according to EP-B No. 361 is particularly advantageous because the reaction can be carried out in this solvent at relatively low temperatures of about 170°–200° C. However, these amorphous polyether sulfones have the disadvantage that they are sensitive to acids and alkalis and in particular to many organic solvents and tend to exhibit stress corrosion cracking. The partially crystalline polyetherketones which are prepared, for example, according to EP-B No.1879 by polycondensation of bisphenols with keto-containing difluoroaromatics in the presence of polar solvents and potassium carbonate do not have this disadvantage. However, sulfonyl-containing solvents have to be used in this case, making it necessary to employ very high temperatures and thus permitting side reactions and decomposition reactions. Furthermore, the polyetherketones melt only at relatively high temperatures above 320° C. and therefore tend to undergo degradation reactions during processing by the thermoplastic method.

EP-A No. 30033 describes copolyethers which are prepared from hydroquinone on the one hand and a mixture of dichlorodiphenyl sulfone with dichlorobenzophenone or difluorobenzophenone on the other hand. The description and Examples 1 to 5 mentioned only copolyethers having a random distribution of keto and sulfonyl groups. Such random copolyethers are still very sensitive to solvents, even in the case of high keto group contents of 60 mol % or more; although this sensitivity decreases at higher contents of keto groups, the strength at high temperatures of about 150° C. also falls to excessively low levels. Moreover, because of its high hydroquinone content, the copolyether according to EP-A No. 30033 has a pale yellow to brown coloration. Example 6 of EP-A No. 30033 describes a block copolyether which contains 20 mol % of sulfonyl groups and 80 mol % of keto groups. This polymer is opaque and has a slightly brownish discoloration and relatively low strength. It is prepared at 225° C. in sulfolane as a solvent; N-methylpyrrolidone cannot be used since the copolymer is not soluble therein.

It is an object of the present invention to prepare aromatic polyethers which on the one hand exhibit good solvent resistance and hence little stress cracking and on the other hand still have sufficient strength at elevated temperatures. Furthermore, the polymers should have little natural color and as far as possible be transparent.

We have found that this object is achieved by the novel process for the preparation of block copolyethers which contain sulfonyl and keto groups by polycondensation of an aromatic dihalogen compound and a bisphenol in the presence of an alkali metal carbonate in N-methyl-pyrrolidin-2-one as a solvent, wherein, in a first stage, polyethersulfone blocks A having a molecular weight Mn of from 1,500 to 30,000 are prepared by reacting (A1) bisphenol A
 bis-(4-hydroxyphenyl) sulfone,
 2,4'-dihydroxydiphenyl sulfone
 or 4,4'-dihydroxydiphenyl
with
(A2)
 bis-(4-chlorophenyl) sulfone
 or bis-(4-fluorophenyl) sulfone, and, in a second stage, polyetherketone blocks B are polymerized onto the living chain ends of blocks A by reacting in ad mixture with the blocks A,
(B1) hydroquinone
with
(B2)
 4,4'-difluorobenzophenone
 or bis-(4-fluorobenzoyl)-benzene, the molar ratio of monomer A2 to monomer B2 being from 90:10 to 40:60. In principle, it is also possible to use mixtures of different types of monomers A1, A2 and B2.

In contrast to the conventional processes for the preparation of copolyethers, in this case the dihalogen compounds are not premixed; instead, a polysulfone block having a defined molecular weight is first formed, this block essentially being free of hydroquinone units, and only thereafter are the monomers which form the ketone block added. The polycondensation can be carried out in N-methylpyrrolidone as a solvent at relatively low temperatures at from 130° to 220° C., preferably from 150° to 210° C.. In principle, it is also possible to prepare corresponding three-block or four-block copolymers.

The preferred molar ratio of monomer A2 to monomer B2 is from 80:20 to 50:50.

To ensure that the overall stoichiometry is maintained, a small excess of the appropriate component B1 or B2 is used, this excess being calculated from the block length of the first block and the molar ratio A2:B2.

The molar ratio of the total amount of dihalogen compounds to the total amount of bisphenols is preferably from 49:51 to 51:49.

To obtain high molecular weights, it may be advantageous if the total amount of dihalogen compound used is slightly in excess, i.e. by up to 10 mol %, of the total amount of bisphenols.

Examples of suitable anhydrous alkali metal carbonates are sodium carbonate and preferably potassium carbonate, as well as mixtures of these.

It may be advantageous if the reaction temperature is increased within the stated limits as the condensation progresses.

The reaction mixture from the first stage is subjected to polycondensation in the stated temperature range until the required degree of condensation is reached. The polycondensation time may be from 0.1 to 15 hours, depending on the type of starting components and the reaction conditions chosen.

The same applies to the second reaction step, the polymerization of the freshly added monomers onto the living polymer blocks.

Any chemically inert groups are suitable terminal groups for the polycondensates. In order to incorporate the terminal groups, a small amount of an appropriate compound is added to the polycondensation mixture, advantageously after the desired degree of polycondensation has been reached. Aliphatic and aromatic halogen compounds, in particular methyl chloride or the above dihalobenzene compounds, are preferably used.

The inorganic components, for example sodium chloride, potassium chloride, sodium fluoride and/or potassium fluoride, can be removed before or after isolation of the polyether by suitable methods, such as dissolving and filtration, sieving or extracting.

The water formed can be removed in both reaction stages with the aid of an azeotrope former or by means of reduced pressure, which is preferably distilled over by passing in a vigorous stream of nitrogen. Suitable formers of azeotropes with water are any substances which boil at the reaction temperature under atmospheric pressure and can be mixed with the reaction mixture to produce a homogeneous mixture which does not undergo chemical reactions. Examples of azeotrope formers of the stated type are chlorobenzene, toluene and xylene, chlorobenzene being preferably used.

The solvent N-methylpyrrolidone is used in amounts of from 5 to 100, preferably from 5 to 20, moles per mol of bisphenol or dihalobenzene compound. This means that, in the absence of the alkali metal carbonate and the azeotrope former, the reaction solutions have a solids content of from 5 to 50, preferably from 10 to 40, % by weight, based on the total weight.

Finally, the polyether can be isolated in various ways. The solid polymer can be separated out by mixing the reaction solution with a precipitating agent, e.g. water and/or methanol, or by vigorous stirring, spraying or atomizing. On the other hand, it is also possible to evaporate the solvent. The inorganic components can be removed from the polyether by a suitable method, such as dissolving, filtering or sieving.

The block copolyethers prepared by the process according to the invention have reduced viscosities (measured at 25° C. in a 1% strength solution in 3:2 4-chlorophenol/1,2-dichlorobenzene) of from 0.4 to 2.5, preferably from 0.6 to 1.5, dl/g.

The block copolymers prepared are very useful for the production of moldings, fibers, films, adhesives and coating materials. They may contain conventional additives, for example glass fibers, carbon fibers, aramid fibers, fillers, dyes and pigments.

With a low content of ether ketone blocks (10–35 mol %, depending on the monomers), whose homopolymers are usually partially crystalline, the block coplymers prepared by the novel process are amorphous but are substantially more resistant to solvents and to stress corrosion than random copolymers having the same composition.

Because these special block copolymers possess high transparency and low absorption (measured at 550 nm in 1% strength solution in 3:2 4-chlorophenol/1,2-dichlorobenzene) of less than 0.35, in particular less than 0.2, coupled with high resistance to solvents, they appear particularly suitable for the production of transparent moldings.

When the block copolymers have higher etherketone contents (30–60 mol %, depending on the monomers) the block copolymers achieve partial crystallinity as a result of heating. This crystallinity is observed in random sulfone/etherketone copolymers under the same conditions only at substantially higher etherketone contents. Because of this partial crystallinity, the block copolymers, which in this case have an opaque appearance, possess, even above their glass transition temperature, a mechanical strength sufficient to prevent a change in shape in a molding on exposure to heat for a short time.

The fact that the polymers prepared according to the invention are true block copolymers and not, as may be presumed, blends of polysulfones and polyetherketones can be demonstrated by carrying out extraction tests with suitable solvents and determining the sulfur content of the polymers in the filtrate and in the residue.

The examples and comparative examples which follow illustrate the invention. Parts are by weight. The reduced viscosities ($\eta_{red}$) were measured at 25° C. in 1% strength solution in 3:2 4-chlorophenol/1,2-dichlorobenzene and converted in accordance with the formula $$\eta_{red} = (\eta\text{spec}/C)$$

EXAMPLE 1

300 parts of N-methylpyrrolidin-2-one and 50 parts of chlorobenzene are added to 100.5 parts of bis-(4-chlorophenyl) sulfone, 82.3 parts of 2,2-bis-(4-hydroxyphenyl)-propane and 54.8 parts of potassium carbonate. The reaction mixture is heated to 170° C. while stirring constantly and passing through nitrogen, and the resulting water of reaction is removed at this temperature in the course of 4 hours with the aid of a water separator. Thereafter, the temperature is increased to 185° C. and stirring is continued for 4 hours at this temperature.

After the reaction mixture has been cooled, 11.9 parts of 4,4'-difluorobenzophenone, 4.62 parts of hydroquinone, 6.39 parts of potassium carbonate and 200 parts of N-methylpyrrolidin-2-one are added. The mixture is heated at 150° C. while constantly passing through nitrogen and, after 1 hour, the temperature is increased to 185° C.. The reaction mixture is kept at this temperature for 7 hours. The polycondensation is terminated by passing in a stream of methyl chloride for 30 minutes. The inorganic components are filtered off, and the polymer is precipitated in water, digested twice with water and dried for 12 hours at 80° C. under reduced pressure. It has a reduced viscosity $\eta_{red}$ of 1.00 dl/g.

EXAMPLE 2

670 parts of N-methylpyrrolidin-2-one and 50 parts of chlorobenzene are added to 114.9 parts of bis-(4-chlorophenyl) sulfone, 94.1 parts of 2,2-bis-(4-hydroxyphenyl)-propane and 62.6 parts of potassium carbonate. The reaction mixture is heated to 170° C. while stirring constantly and passing through nitrogen, and the resulting water of reaction is removed at this temperature in the course of 4 hours with the aid of a water separator. Thereafter, the temperature is increased to 185° C. and stirring is continued for 4 hours at this temperature.

After the reaction mixture has been cooled, 30.0 parts of 4,4'-difluorobenzophenone, 13.2 parts of hydroquinone and 18.3 parts of potassium carbonate are added. The mixture is heated at 150° C. while constantly passing through nitrogen and, after 1 hour, the temperature is increased to 185° C.. The reaction mixture is kept at this temperature for 7 hours. The polycondensation is terminated by passing in a stream of methyl chloride for 30 minutes. The polymer is precipitated in water, and the inorganic components are removed by repeated washing. Thereafter, the polymer is dried for 12 hours at 80° C. under reduced pressure. It has a reduced viscosity $\eta_{red}$ of 1.72 dl/g.

EXAMPLE 3

350 parts of N-methylpyrrolidin-2-one and 50 parts of chlorobenzene are added to 86.2 parts of bis-(4-chlorophenyl) sulfone, 70.5 parts of 2,2-bis-(4-hydroxyphenyl)-propane and 47.0 parts of potassium carbonate. The reaction mixture is heated to 170° C. while stirring constantly and passing through nitrogen, and the resulting water of reaction is removed at this temperature in the course of 3 hours with the aid of a water separator. Thereafter, the temperature is increased to 185° C. and stirring is continued for 4 hours at this temperature.

After the reaction mixture has been cooled, 44.2 parts of 4,4'-difluorobenzophenone, 19.8 parts of hydroquinone, 27.4 parts of potassium carbonate and 320 parts of N-methylpyrrolidin-2-one are added. The mixture is heated at 150° C. while constantly passing through nitrogen and, after 1 hour, the temperature is increased to 185° C.. The reaction mixture is kept at this temperature for 6 hours. The polycondensation is terminated by passing in a stream of methyl thloride for 30 minutes. The polymer is precipitated in water, and the inorganic components are removed by repeated washing with water. The polymer obtained is dried for 12 hours at 80° C. under reduced pressure. It has a reduced viscosity $\eta_{red}$ of 1.14 dl/g.

EXAMPLE 4

330 parts of N-methylpyrrolidin-2-one are added to 57.4 parts of bis-(4-chlorophenyl) sulfone, 47.0 parts of 2,2-bis-(4-hydroxyphenyl)-propane and 31.3 parts of potassium carbonate. The reaction mixture is heated to 170° C. while stirring constantly, and the resulting water of reaction is expelled into a water separator at this temperature in the course of 4 hours by means of a vigorous stream of nitrogen. Thereafter, the temperature is increased to 185° C. and stirring is continued for 4 hours at this temperature.

After the reaction mixture has been cooled, 48.0 parts of 4,4'-difluorobenzophenone, 22.0 parts of hydroquinone, 30.4 parts of potassium carbonate and 330 parts of N-methylpyrrolidin-2-one are added. The mixture is heated at 150° C. while constantly passing nitrogen and, after 1 hour, the temperature is increased to 185° C. The reaction mixture is kept at this temperature for 7 hours. The polycondensation is terminated by passing in a stream of methyl chloride for 30 minutes. The polymer is precipitated in 1:1 water/methanol and washed several times with water in order to remove the inorganic components, after which it is dried for 12 hours at 100° C. under reduced pressure. It has a reduced viscosity $\eta_{red}$ of 1.11 dl/g.

EXAMPLE 5

175 parts of N-methylpyrrolidin-2-one and 50 parts of chlorobenzene are added to 57.4 parts of bis-(4-chlorophenyl) sulfone, 47.9 parts of 2,2-bis-(4-hydroxyphenyl)-propane and 31.9 parts of potassium carbonate. The reaction mixture is heated to 170° C. while stirring constantly and passing through nitrogen, and the resulting water of reaction is removed at this temperature in the course of 3 hours with the aid of a water separator. Thereafter, the temperature is increased to 185° C. and stirring is continued for 3 hours at this temperature.

After the reaction mixture has been cooled, 48.1 parts of 4,4'-difluorobenzophenone, 22.0 parts of hydroquinone, 30.4 parts of potassium carbonate and 325 parts of N-methylpyrrolidin-2-one are added. The mixture is heated at 150° C. while constantly passing through nitrogen and, after 1 hour, the temperature is increased to 180° C. The reaction mixture is kept at this temperature for 6 hours. The polycondensation is terminated by passing in a stream of methyl chloride for 30 minutes. The polymer is precipitated in water and washed several times with water to remove the inorganic components. After drying for 12 hours at 100° C. under reduced pressure, the copolymer has a reduced viscosity $\eta_{red}$ of 1.29 dl/g.

EXAMPLE 6

175 parts of N-methylpyrrolidin-2-one and 50 parts of chlorobenzene are added to 57.4 parts of bis-(4-chlorophenyl) sulfone, 50.2 parts of 2,2-bis-(4-hydroxyphenyl)-propane and 33.5 parts of potassium carbonate. The reaction mixture is heated to 170° C. while stirring constantly and passing through nitrogen, and the resulting water of reaction is removed at this temperature in the course of 3 hours with the aid of a water separator. Thereafter, the temperature is increased to 185° C. and stirring is continued for 4 hours at this temperature.

After the reaction mixture has cooled, 49.8 parts of 4,4'-difluorobenzophenone, 22.0 parts of hydroquinone, 30.4 parts of potassium carbonate and 325 parts of N-methylpyrrolidin-2-one are added. The mixture is heated at 150° C. while constantly passing through nitrogen and, after 1 hour, the temperature is increased to 185° C. The reaction mixture is kept at this temperature for 6 hours. The polycondensation is terminated by passing in a stream of methyl chloride for 30 minutes. The polymer is precipitated in water, and the inorganic components are removed by repeated washing with water. The polymer obtained is dried for 12 hours at 80° C. under reduced pressure. It has a reduced viscosity $\eta_{red}$ of 1.10 dl/g.

EXAMPLE 7

200 parts of N-methylpyrrolidin-2-one and 50 parts of chlorobenzene are added to 57.4 parts of bis-(4-chlorophenyl) sulfone, 47.0 parts of 2,2-bis-(4-hydroxyphenyl)-propane and 31.3 parts of potassium carbonate. The reaction mixture is heated to 170° C. while stirring constantly and passing through nitrogen, and the resulting water of reaction is removed at this temperature in the course of 3 hours with the aid of a water separator. Thereafter, the temperature is increased to 185° C. and stirring is continued for 4 hours at this temperature.

After the reaction mixture has been cooled, 64.0 parts of 4,4'-difluorobenzophenone, 30.0 parts of hydroquinone, 41.5 parts of potassium carbonate and 450 parts of N-methylpyrrolidin-2-one are added. The mixture is heated at 150° C. while constantly passing through nitrogen and, after 1 hour, the temperature is increased to 185° C. The reaction mixture is kept at this temperature for 6 hours. The polycondensation is terminated by passing in a stream of methyl chloride for 30 minutes. The polymer is precipitated in water, and the inorganic components are removed by repeated washing with water. The polymer obtained is dried for 12 hours at 80° C. under reduced pressure. It has a reduced viscosity $\eta_{red}$ of 0.85 dl/g.

EXAMPLE 8

225 parts of N-methylpyrrolidin-2-one and 50 parts of chlorobenzene are added to 71.8 parts of bis-(4-chlorophenyl) sulfone, 64.5 parts of bis-(4-hydroxyphenyl) sulfone and 39.2 parts of potassium carbonate. The reaction mixture is heated to 170° C. while stirring constantly and passing through nitrogen, and the resulting water of reaction is removed at this temperature in the course of 4 hours with the aid of a water separator. Thereafter, the temperature is increased to 185° C. and stirring is continued for 4 hours at this temperature.

After the reaction mixture has cooled, 19.5 parts of 4,4'-difluorobenzophenone, 8.3 parts of hydroquinone, 11.4 parts of potassium carbonate and 275 parts of N-methylpyrrolidin-2-one are added. The mixture is heated at 150° C. while constantly passing through nitrogen and, after 1 hour, the temperature is increased to 185° C. The reaction mixture is kept at this temperature for 6 hours. The polycondensation is terminated by passing in a stream of methyl chloride for 30 minutes. The polymer is precipitated in water and washed several times with water to remove the inorganic components. After drying for 12 hours at 80° C. under reduced pressure, the copolymer has Z a reduced viscosity of $\eta_{red}$ of 1.09 dl/g.

EXAMPLE 9

175 parts of N-methylpyrrolidin-2-one and 50 parts of chlorobenzene are added to 57.4 parts of bis-(4-chlorophenyl) sulfone, 51.6 parts of bis-(4-hydroxyphenyl) sulfone and 31.3 parts of potassium carbonate. The reaction mixture is heated to 170° C. while stirring constantly and passing through nitrogen, and the resulting water of reaction is removed at this temperature in the course of 4 hours with the aid of a water separator. Thereafter, the temperature is increased to 185° C. and stirring is continued for 4 hours at this temperature.

After the reaction mixture has cooled, 28.2 parts of 4,4'-difluorobenzophenone, 13.2 parts of hydroquinone, 18.2 parts of potassium carbonate and 325 parts of N-methylpyrrolidin-2-one are added. The mixture is heated at 150° C. while constantly passing through nitrogen and, after 1 hour, the temperature is increased to 185° C. The reaction mixture is kept at this temperature for 6 hours. The polycondensation is terminated by passing in a stream of methyl chloride for 30 minutes. The polymer is precipitated in water and washed several times with water to remove the inorganic components. After drying for 12 hours at 80° C. under reduced pressure, the copolymer has a reduced viscosity of $\eta_{red}$ of 1.08 dl/g.

EXAMPLE 10

220 parts of N-methylpyrrolidin-2-one are added to 71.8 parts of bis-(4-chlorophenyl) sulfone, 58.8 parts of 2,2-bis-(4-hydroxyphenyl)-propane and 39.1 parts of potassium carbonate. The reaction mixture is heated at 170° C. with constant stirring, and the resulting water of reaction is expelled into a water separator for 4 hours at this temperature by means of a vigorous stream of nitrogen. Thereafter, the temperature is increased to 185° C. and stirring is continued for 4 hours at this temperature.

After the reaction mixture has been cooled, 27.7 parts of 1,4-bis-(4-fluorobenzoyl)-benzene, 8.3 parts of hydroquinone, 11.4 parts of potassium carbonate and 320 parts of N-methylpyrrolidin-2-one are added. The mixture is heated at 150° C. while constantly passing through nitrogen and, after 1 hour, the temperature is increased to 185° C. The reaction mixture is kept at this temperature for 7 hours. The polycondensation is terminated by passing in a stream of methyl chloride for 30 minutes. The polymer is precipitated in 1:1 water/methanol and washed several times with water in order to remove the inorganic components, after which it is dried for 12 hours at 100° C. under reduced pressure It has a reduced viscosity $\eta_{red}$ of 1.05 dl/g.

EXAMPLE 11

230 parts of N-methylpyrrolidin-2-one are added to 71.8 parts of bis-(4-chlorophenyl) sulfone, 64.4 parts of 4,4'-bis-(4-hydroxyphenyl) sulfone and 39.1 parts of potassium carbonate. The reaction mixture is heated at 170° C. with constant stirring, and the resulting water of reaction is expelled into a water separator for 4 hours at this temperature by means of a vigorous stream of nitrogen. Thereafter, the temperature is increased to 185° C. and stirring is continued for 4 hours at this temperature.

After the reaction mixture has been cooled, 27.7 parts of 1,4-bis-(4-fluorobenzoyl)-benzene, 8.3 parts of hydroquinone, 11.4 parts of ootassium carbonate and 340 parts of N-methylpyrrolidin-2-one are added. The mixture is heated at 150° C. while constantly passing nitrogen and, after 1 hour, the temperature is increased to 185° C. The reaction mixture is kept at this temperature for 7 hours. The polycondensation is terminated by passing in a stream of methyl chloride for 30 minutes. The polymer is precipitated in 1:1 water/methanol and washed several times with water in order to remove the inorganic components, after which it is dried for 12 hours at 100° C. under reduced pressure. It has a reduced viscosity $\eta_{red}$ of 0.90 dl/g.

EXAMPLE 12

220 parts of N-methylpyrrolidin-2-one are added to 71.8 parts of bis-(4-chlorophenyl) sulfone, 32.2 parts of 4,4'-bis-(4-hydroxyphenyl) sulfone, 29.4 parts of 2,2-bis-(4-hydroxyphenyl)-propane and 39.1 parts of potassium carbonate. The reaction mixture is heated at 170° C. with constant stirring, and the resulting water of reaction is expelled into a water separator for 4 hours at this temperature by means of a vigorous stream of nitrogen. Thereafter, the temperature is increased to 185° C. and stirring is continued for 4 hours at this temperature.

After the reaction mixture has been cooled, 18.7 parts of 4,4'-difluorobenzophenone, 8.3 parts of hydroquinone, 11.4 parts of potassium carbonate and 300 parts of N-methylpyrrolidin-2-one are added. The mixture is heated at 150° C. while constantly passing nitrogen and, after 1 hour, the temperature is increased to 185° C. The reaction mixture is kept at this temperature for 7 hours. The polycondensation is terminated by passing in a stream of methyl chloride for 30 minutes. The polymer is precipitated in 1:1 water/methanol and washed several times with water in order to remove the inorganic components, after which it is dried for 12 hours at 100° C. under reduced pressure. It has a reduced viscosity $\eta_{red}$ of 0.95 dl/g.

EXAMPLE 13

230 parts of N-methylpyrrolidin-2-one are added to 71.8 parts of bis-(4-chlorophenyl) sulfone, 32.2 parts of 4,4'-bis-(4-hydroxyphenyl) sulfone, 29.4 parts of 2,2-bis-(4-hydroxyphenyl)-propane and 39.1 parts of potassium carbonate. The reaction mixture is heated at 170° C. with constant stirring, and the resulting water of reaction is expelled into a water separator for 4 hours at this temperature by means of a vigorous stream of nitrogen. Thereafter, the temperature is increased to 185° C. and stirring is continued for 4 hours at this temperature.

After the reaction mixture has been cooled, 27.7 parts of 1,4-bis-(4-fluorobenzoyl)-benzene, 8.3 parts of hydroquinone, 11.4 parts of potassium carbonate and 340 parts of N-methylpyrrolidin-2-one are added. The mixture is heated at 150° C. while constantly passing nitrogen and, after 1 hour, the temperature is increased to 185° C. The reaction mixture is kept at this temperature for 7 hours. The polycondensation is terminated by passing in a stream of methyl chloride for 30 minutes. The polymer is precipitated in 1:1 water/methanol and washed several times with water in order to remove the inorganic components, after which it is dried for 12 hours at 100° C. under reduced pressure. It has a reduced viscosity $\eta_{red}$ of 1.05 dl/g.

EXAMPLE 14

220 parts of N-methylpyrrolidin-2-one are added to 71.8 parts of bis-(4-chlorophenyl) sulfone, 58.8 parts of 2,2-bis-(4-hydroxyphenyl)-propane and 39.1 parts of potassium carbonate. The reaction mixture is heated at 170° C. with constant stirring, and the resulting water of reaction is expelled into a water separator for 4 hours at this temperature by means of a vigorous stream of nitrogen. Thereafter, the temperature is increased to 185° C. and stirring is continued for 4 hours at this temperature.

After the reaction mixture has cooled, 13.8 parts of 1,4-bis-(4-fluorobenzoyl)-benzene, 9.4 parts of 4,4'-difluorobenzophenone, 8.3 parts of hydroquinone, 11.4 parts of potassium carbonate and 280 parts of N-methylpyrrolidin-2-one are added. The mixture is heated at 150° C. while constantly passing nitrogen and, after 1 hour, the temperature is increased to 185° C. The reaction mixture is kept at this temperature for 7 hours. The polycondensation is terminated by passing in a stream of methyl chloride for 30 minutes. The polymer is precipitated in 1:1 water/methanol and washed several times with water in order to remove the inorganic components, after which it is dried for 12 hours at 100° C. under reduced pressure. It has a reduced viscosity $\eta_{red}$ of 1.21 dl/g.

EXAMPLE 15

220 parts of N-methylpyrrolidin-2-one are added to 71.8 parts of bis-(4-chlorophenyl) sulfone, 64.4 parts of 4,4-bis-(4-hydroxyphenyl) sulfone and 39.1 parts of potassium carbonate. The reaction mixture is heated at 170° C. with constant stirring, and the resulting water of reaction is expelled into a water separator for 4 hours at this temperature by means of a vigorous stream of nitrogen. Thereafter, the temperature is increased to 185° C. and stirring is continued for 4 hours at this temperature.

After the reaction mixture has cooled, 13.8 parts of 1,4-bis-(4-fluorobenzoyl)-benzene, 9.4 parts of 4,4'-difluorobenzophenone, 8.3 parts of hydroquinone, 11.4 parts of potassium carbonate and 290 parts of N-methylpyrrolidin-2-one are added. The mixture is heated at 150° C. while constantly passing nitrogen and, after 1 hour, the temperature is increased to 185° C. The reaction mixture is kept at this temperature for 7 hours. The polycondensation is terminated by passing in a stream of methyl chloride for 30 minutes. The polymer is precipitated in 1:1 water/methanol and washed several times with water in order to remove the inorganic components, after which it is dried for 12 hours at 100° C. under reduced pressure. It has a reduced viscosity $\eta_{red}$ of 0.82 dl/g.

EXAMPLE 16

220 parts of N-methylpyrrolidin-2-one are added to 71.8 parts of bis-(4-chlorophenyl) sulfone, 32.2 parts of 4,4-bis-(4-hydroxyphenyl) sulfone, 29.4 parts of 2,2-bis-(4-hydroxyphenyl)-propane and 39.1 parts of potassium carbonate. The reaction mixture is heated at 170° C. with constant stirring and the resulting water of reaction is expelled into a water separator for 4 hours at this temperature by means of a vigorous stream of nitrogen. Thereafter, the temperature is increased to 185° C. and stirring is continued for 4 hours at this temperature.

After the reaction mixture has cooled, 13.8 parts of 1,4-bis-(4-fluorobenzoyl)-benzene, 9.4 parts of 4,4'-difluorobenzophenone, 8.3 parts of hydroquinone, 11.4 parts of potassium carbonate and 290 parts of N-methylpyrrolidin-2-one are added. The mixture is heated at 150° C. while constantly passing nitrogen and, after 1 hour, the temperature is increased to 185° C. The reaction mixture is kept at this temperature for 7 hours. The polycondensation is terminated by passing in a stream of methyl chloride for 30 minutes. The polymer is precipitated in 1:1 water/methanol and washed several times with water in order to remove the inorganic components, after which it is dried for 12 hours at 100° C. under reduced pressure. It has a reduced viscosity $\eta_{red}$ of 0.97 dl/g.

COMPARATIVE EXAMPLE A (Polysulfone)

114.9 parts of bis-(4-chlorophenyl) sulfone and 91.3 parts of 2,2-bis-(4-hydroxyphenyl)-propane are dissolved in 400 parts of N-methylpyrrolidin-2-one and 50 parts of chlorobenzene, and 60.8 parts of anhydrous potassium carbonate are added. The reaction mixture is heated to 150° C. in the course of two hours, a mixture of water and chlorobenzene constantly being distilled off. The temperature is then increased to 180° C., and the reaction mixture is kept at this temperature for 7 hours. The polycondensation is terminated by passing in a stream of methyl chloride for 30 minutes. The inorganic components are filtered off, and the polymer is precipitated in water and dried for 12 hours at 80° C. under reduced pressure. It has a reduced viscosity $\eta_{red}$ of 0.85 dl/g but is substantially soluble in methylene chloride, acetone and chlorobenzene and its resistance to solvents is thus insufficient for many applications.

COMPARATIVE EXAMPLE B (Polyethersulfone)

The procedure described in Comparative Example A is followed, except that all of the 2,2-bis-(4-hydroxyphenyl)-propane is replaced by 100.1 parts of bis-(4-hydroxyphenyl sulfone. After only 6 hours at 180° C., a high polymer having a reduced viscosity $\eta_{red}$ of 0.60 dl/g is obtained; however, this polymer is substantially soluble in methylene chloride, acetone and chlorobenzene and its resistance to solvents is thus insufficient for many applications.

COMPARATIVE EXAMPLE C (Polyetheretherketone)

218.2 parts of 4,4'-difluorobenzophenone, 110.1 parts of hydroquinone and 600 parts of diphenyl sulfone are introduced into a three-necked flask provided with a stirrer, a nitrogen inlet tube and a reflux condenser. This stirred reaction mixture is heated to 180° C. and forms a virtually colorless solution. 140 parts of anhydrous potassium carbonate are added, after which the temperature is increased to 200° C. and the mixture is kept at this temperature for 1 hour. It is then heated to 250° C. and stirred at this temperature, likewise for 1 hour; finally, the temperature is increased to 320° C., the polymer remaining in solution. The reaction mixture is cooled, the resulting solid is milled, and diphenyl sulfone and inorganic salts are separated off by repeated washing with acetone, water and acetone/methanol. The resulting solid, partially crystalline polymer is dried at 140° C. under reduced pressure and has a reduced viscosity $\eta_{red}$ of 1.30 dl/g. A film prepared from this polymer by pressing at 380° C. is opaque. The crystal melting point is 334° C. and the glass transition temperature is about 140° C. according to DSC measurements.

COMPARATIVE EXAMPLE D (Random Copolymer)

500 parts of N-methylpyrrolidin-2-one and 50 parts of chlorobenzene are added to 86.2 parts of bis-(4-chlorophenyl) sulfone, 70.5 parts of 2,2-bis-(4-hydroxyphenyl)propane, 44.2 parts of 4,4'-difluorobenzophenone, 19.8 parts of hydroquinone and 74.4 parts of potassium carbonate. The reaction mixture is heated to 170° C. while constantly stirring and passing through nitrogen, and the resulting water of reaction is removed in the course of 4 hours at this temperature with the aid of a water separator. Thereafter, the temperature is increased to 185° C. and stirring is continued for 8 hours at this temperature. The polycondensation is terminated by passing in a stream of methyl chloride for 30 minutes. The polymer is precipitated in water, and the inorganic components are removed by repeated washing with water. The resulting random polymer is dried for 12 hours at 80° C. under reduced pressure. It has a reduced viscosity $\eta_{red}$ of 0.77 dl/g and is completely soluble in methylene chloride.

COMPARATIVE EXAMPLE E 34.46 parts of bis-(4-chlorophenyl) sulfone, 14.09 parts of hydroquinone and 21.23 parts of potassium carbonate in 200 ml of sulfolane and 160 ml of toluene are stirred for 1 hour at room temperature while passing through a stream of nitrogen. The temperature of the reaction mixture is then increased to 180° C. in the course of 2 hours while distilling off the toluene.

After the mixture has been cooled to room temperature, 104.74 parts of 4,4'-difluorobenzophenone, 51.97 parts of hydroquinone, 78.28 parts of potassium carbonate, 200 ml of toluene and 360 ml of sulfolane are added, and stirring is continued for 30 minutes at room temperature while passing through a stream of nitrogen. Thereafter, the mixture is refluxed for one hour at 140°–150° C., after which the temperature of the reaction mixture is increased to 225° C. by distilling off the toluene. Fresh toluene is added dropwise. After a reaction time of about 40 minutes at 225° C., methyl chloride is passed into the reaction mixture which, after 15 minutes, abruptly becomes so viscous that it can no longer be stirred.

After cooling, the solid contents of the flask are finely comminuted and washed 4 times with warm water. For the final wash, the washwater is brought to pH 2 with oxalic acid. The polymer obtained is dried for 24 hours at 200° C. under reduced pressure. It has a reduced viscosity $\eta_{red}$ of 1.05 dl/g, a glass transition temperature of 163° C. and a melting point of 321° C. according to DSC measurements. The modulus of elasticity is 2,700 N/mm$^2$ (at 23° C.), ie. moldings produced from this copolymer have very low rigidity.

TABLE

| Example | Molar ratio A2/B2 | Block length sulfone | Tg °C. | Tm °C. | Residue on extraction with CH$_2$Cl$_2$ (%) | Modulus of elasticity (N/mm$^2$) |
|---|---|---|---|---|---|---|
| 1 | 86.5/13.5 | 15000 | 183 | — | 0 | |
| 2 | 74.4/25.5 | 15000 | 178 | — | 70 | |
| 3 | 59.7/40.3 | 15000 | 174 | 323 | 70 | 5100 |
| 4 | 47.6/52.4 | 15000 | 171 | 326 | 78 | |
| 5 | 47.6/52.4 | 9000 | 170 | 315 | 89 | |
| 6 | 46.7/53.3 | 4700 | 167 | 310 | 88 | |
| 7 | 40.6/59.4 | 15000 | 166 | 329 | 70 | |
| 8 | 73.6/26.3 | 15700 | 203 | — | | |
| 9 | 60.7/39.3 | 15700 | 190 | — | 80 | |
| A | 100/0.0 | | 188 | — | 0 | |
| B | 100/0.0 | | 230 | — | 0 | |
| C | 0.0/100 | | 145 | 334 | 96 | |
| D | 59.6 | 40.4 | 159 | — | | 0 |
| E | 20/80 | 5000 | 163 | 321 | 85 | 2700 |

We claim:

1. A process for the preparation of a block copolyether, which contains sulfonyl and keto groups by two stage polycondensation, which comprises in a first stage, preparing polyethersulfone blocks A having a molecular weight Mn of from 1,500 to 30,000 by reacting A1) a bisphenol selected from the group consisting of bisphenol A, bis-(4-hydroxyphenyl) sulfone, 2,4'-dihydroxydiphenyl sulfone, 4,4'-dihydroxydiphenyl and mixtures thereof with A2) a dihalogen compound selected from the group consisting of bis-(4-chlorophenyl) sulfone, bis-(4-fluorophenyl) sulfone and mixtures thereof, to prepare said polyethersulfone blocks A, and, in a second stage, preparing said block copolyether which contains sulfonyl and keto groups by reacting said polyethersulfone blocks A with a mixture of B1) hydroquinone as bisphenol and B2) a dihalogen compound selected from the group consisting of 4,4'-difluorobenzophenone, bis-(4-fluorobenzoyl)-benzene and mixtures thereof, the molar ratio of monomer A2 to monomer B2 being from 90:10 to 40:60, to thereby polymerize polyetherketone blocks B on the ends of polyethersulfone blocks A, each stage of the process being carried out in the presence of an alkali metal carbonate in N-methylpyrrolidin-2-one as a solvent.

2. A process for the preparation of a block copolyether which contains sulfonyl and keto groups as claimed in claim 1, wherein the molar ratio of monomer A2 to monomer B2 is from 90:10 to 65:35, and the prepared block copolyether is transparent.

* * * * *